US007366533B2

(12) United States Patent
Biggs et al.

(10) Patent No.: US 7,366,533 B2
(45) Date of Patent: Apr. 29, 2008

(54) METHODS FOR PROVIDING ACCESS TO WIRELESS RESOURCES IN A TRUNKED RADIO COMMUNICATION SYSTEM

(75) Inventors: Robert A Biggs, Evanston, IL (US); Jeffrey S Anderson, Glen Ellyn, IL (US); Michael P McMahon, Algonquin, IL (US); Leslie G Gustafson, Jr., Oakwood Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 969 days.

(21) Appl. No.: 09/859,175

(22) Filed: May 16, 2001

(65) Prior Publication Data

US 2002/0173311 A1    Nov. 21, 2002

(51) Int. Cl.
*H04B 7/00* (2006.01)
*H04Q 7/20* (2006.01)

(52) U.S. Cl. ............... 455/509; 455/450; 455/518; 455/520; 370/395.2; 370/462

(58) Field of Classification Search ............... 455/509, 455/518, 520, 450; 370/310.1, 462, 310.2, 370/463, 395.2, 439
See application file for complete search history.

(56) References Cited

U.S. PATENT DOCUMENTS

| | | | | |
|---|---|---|---|---|
| 5,025,254 A | * | 6/1991 | Hess | 455/518 |
| 5,040,238 A | * | 8/1991 | Comroe et al. | 455/520 |
| 5,173,933 A | * | 12/1992 | Jabs et al. | 455/405 |
| 5,235,631 A | * | 8/1993 | Grube et al. | 455/509 |
| 5,313,653 A | * | 5/1994 | Sasuta | 455/17 |
| 5,349,342 A | * | 9/1994 | Nilles et al. | 340/2.1 |
| 5,483,672 A | * | 1/1996 | Sasuta | 455/509 |
| 5,511,232 A | * | 4/1996 | O'Dea et al. | 455/519 |
| 5,512,884 A | * | 4/1996 | Hesse et al. | 455/509 |

(Continued)

FOREIGN PATENT DOCUMENTS

CA    2277054 A1    7/1998

(Continued)

*Primary Examiner*—Sujatha Sharma
(74) *Attorney, Agent, or Firm*—Terri S. Hughes

(57) ABSTRACT

Methods are disclosed for providing requested access, network-initiated access and autonomous access to communication resources (101-105) by wireless communication unit(s) (112, 114), and for controlling the different types of access using access control identifier(s) assigned to the devices. Requested access requires a communication unit to send a call request (302) to a communication resource controller (106). The request (302) includes at least an identification of the communication unit and an access control identifier associated with the communication unit. Network-initiated access comprises a communication resource controller or other fixed network equipment sending a page request (502) to the communication unit which responds with a page response message (504) including the identification of the communication unit and an access control identifier. The communication resource controller (106) determines, based on the access control identifier, whether a communication resource is available to support the request. Autonomous access comprises the communication unit (112, 114) receiving a service advertisement message (402) identifying a communication resource and one or more access control identifiers associated with the communication resource. The communication unit determines its eligibility for autonomous access based on the service advertisement message. The service advertisement message may be used to indicate an availability status of communication resources as available for autonomous access or requested access or not available for selected user groups.

9 Claims, 3 Drawing Sheets

U.S. PATENT DOCUMENTS

| | | | |
|---|---|---|---|
| 5,802,502 A * | 9/1998 | Gell et al. | 705/37 |
| 5,987,021 A * | 11/1999 | Erickson et al. | 370/347 |
| 6,078,651 A * | 6/2000 | Den Hartog | 379/112.06 |
| 6,131,027 A * | 10/2000 | Armbruster et al. | 455/428 |
| 6,421,374 B2 * | 7/2002 | Blakeney et al. | 375/220 |
| 6,442,390 B1 * | 8/2002 | Sano | 455/450 |
| 6,496,928 B1 * | 12/2002 | Deo et al. | 713/153 |
| 6,510,515 B1 * | 1/2003 | Raith | 713/163 |
| 6,708,037 B1 * | 3/2004 | Moulsley et al. | 455/452.1 |
| 6,732,176 B1 * | 5/2004 | Stewart et al. | 709/227 |
| 6,741,856 B2 * | 5/2004 | McKenna et al. | 455/422.1 |
| 6,885,874 B2 * | 4/2005 | Grube et al. | 455/520 |
| 6,894,994 B1 * | 5/2005 | Grob et al. | 370/335 |
| 2002/0062295 A1 * | 5/2002 | Enenkel et al. | 706/12 |
| 2002/0101858 A1 * | 8/2002 | Stuart et al. | 370/352 |
| 2002/0151321 A1 * | 10/2002 | Winchell et al. | 455/519 |
| 2005/0044280 A1 * | 2/2005 | Reisman | 710/1 |
| 2006/0274700 A1 * | 12/2006 | Janneteau et al. | 370/338 |
| 2007/0026871 A1 * | 2/2007 | Wager | 455/456.1 |

FOREIGN PATENT DOCUMENTS

| | | |
|---|---|---|
| CA | 2326750 | 10/1999 |

\* cited by examiner

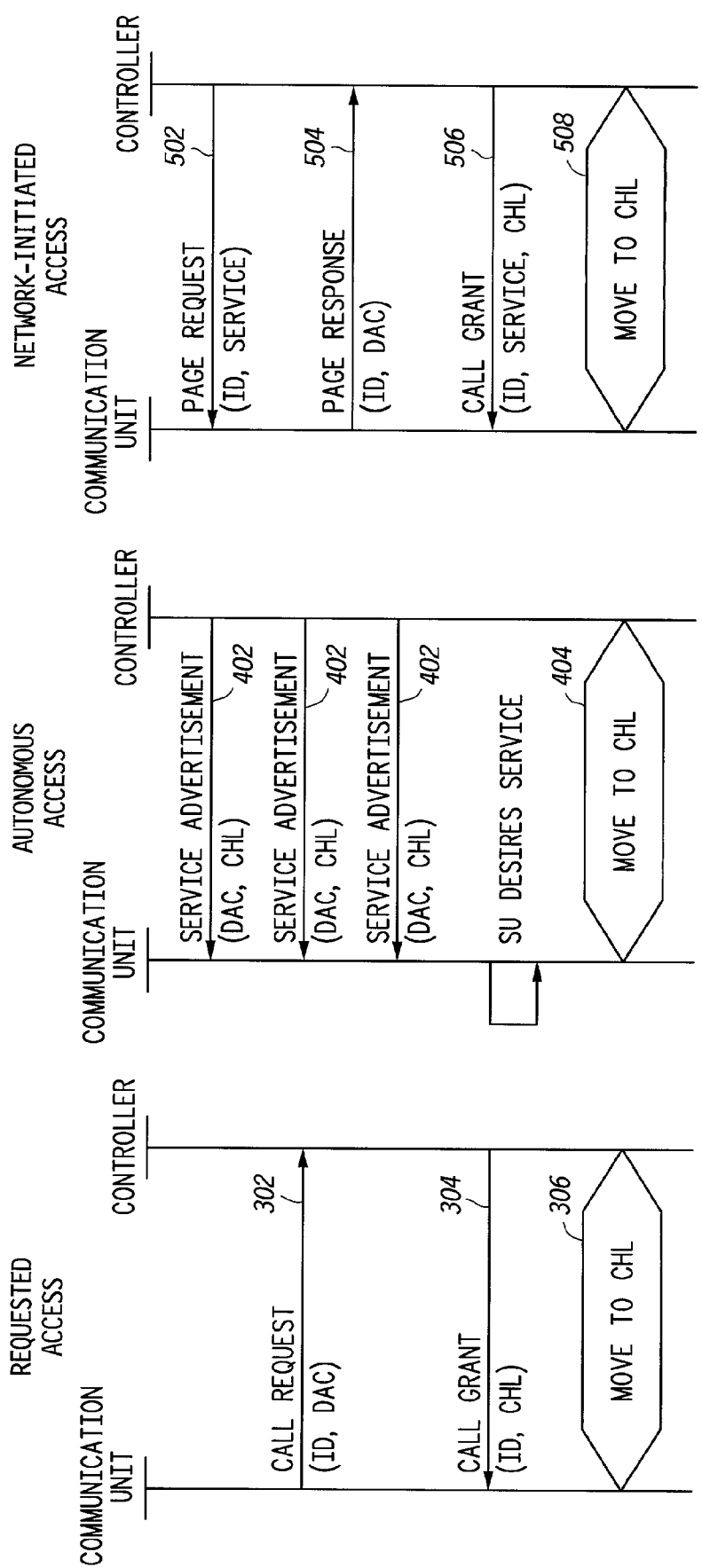

METHODS FOR PROVIDING ACCESS TO WIRELESS RESOURCES IN A TRUNKED RADIO COMMUNICATION SYSTEM

FIELD OF THE INVENTION

This invention relates generally to communication systems, and particularly to the allocation of radio frequency (RF) communication resources in trunked radio communication systems.

BACKGROUND OF THE INVENTION

Trunked radio communication systems are known to include a communication resource controller, sometimes referred to as a central controller or zone controller, for allocating RF communication resources among communication devices, including mobile or portable wireless communication units and base site RF transceivers (sometimes called "base site repeaters") that are distributed among one or more sites. The communication resource controller may reside within a single device or multiple devices and may be located at a fixed equipment site or may be distributed among various base sites. The RF resources may comprise, for example, narrow band frequency modulated channels, time division modulated slots, carrier frequencies, frequency pairs, or generally any medium for communicating information, such as voice, video, or data traffic ("payload information") or control signaling ("control information") to and from the communication units and/or RF transceivers over wireless link(s).

Historically, a wireless communication unit desiring to participate in a communication sends a call request to the communication resource controller for access to a communication resource. Often, the call request is sent via a control channel dedicated for control traffic. The request usually includes an identification (ID) of the communication unit, an identification of a target communication unit, or units and may designate a particular type of service. For example, the request may be for a talk group call which can be made up of communication units and/or consoles at different sites desiring to participate in a group or dispatch call. Upon receiving the request, the communication resource controller grants the request based on authorization of the communication unit for the requested service and an availability of communication resource(s) to support the request. Upon granting the request, the communication resource controller allocates communication resource(s) to support the communication and transmits a communication resource allocation message (e.g., call grant message) to at least the initiating and target devices, typically on the control channel. Thereafter, participating communication units may access the allocated communication resource to partake in the communication.

Oftentimes, trunking systems partition the available communication resources for use by different user groups which may correspond, for example, to different organizations, grades of service, priorities and/or radio capabilities. For example, consider a site having five narrowband channels: channel 1 may comprise a dedicated control channel, channels 2 and 3 dedicated for user group A (e.g., police), channel 4 dedicated for user group B (e.g., fire) and channel 5 dedicated for user group C (e.g., animal control). Alternatively, channel(s) may be partitioned for use by multiple groups. For example, channels 2, 3, 4 and 5 could be partitioned for use by either user group A, B or C and assigned dynamically by the communication resource controller. In either case, the determination of communication resource availability heretofore has been made by the communication resource controller based on mapping the ID of the requesting communication unit to a particular user group, then determining the availability of communication resource(s) associated with that group. To that end, the communication resource controller maintains a database that keeps track of the unit ID of each individual communication unit in the system and its currently associated user group.

This method of communication resource allocation works very well in many trunking communication system applications but is subject to inefficiencies in some instances. For example, most particularly where a communication unit desires to communicate relatively short bursts of information (e.g., packet data), the practice of requesting channel access from the communication resource controller via the control channel before obtaining access to a communication resource can result in a disproportionate amount of control traffic for service requests and grants. Moreover, maintaining a mapping, by the communication resource controller, of communication unit ID to user groups can be inefficient, particularly where the communication resource controller is distributed among multiple sites and/or where there are multiple communication units in the system.

Accordingly, it would be desirable to allow for wireless communication units to send and/or receive messages autonomously in some instances (i.e., without requesting resources from the communication resource controller) and hence, without using the control channel. At the same time, it would be desirable to provide for requested access as may be appropriate in other instances and for controlling the provisioning between autonomous and requested access for loading purposes. Further, it would be desirable for a communication resource controller to allocate communication resources partitioned for autonomous or requested access by different user groups at a site without relying on a mapping of communication unit ID's to user groups. The present invention is directed to satisfying these needs.

BRIEF DESCRIPTION OF THE DRAWINGS

The foregoing and other advantages of the invention will become apparent upon reading the following detailed description and upon reference to the drawings in which:

FIG. 3 is a message sequence chart illustrating requested access to a communication resource by a communication unit using an access control identifier according to one embodiment of the present invention;

FIG. 4 is a message sequence chart illustrating autonomous access to a communication resource by a communication unit using an access control identifier according to one embodiment of the present invention;

FIG. 5 is a message sequence chart illustrating network-initiated access to a communication resource by a communication unit using an access control identifier according to one embodiment of the present invention.

DESCRIPTION OF PREFERRED EMBODIMENTS

Figure 1:
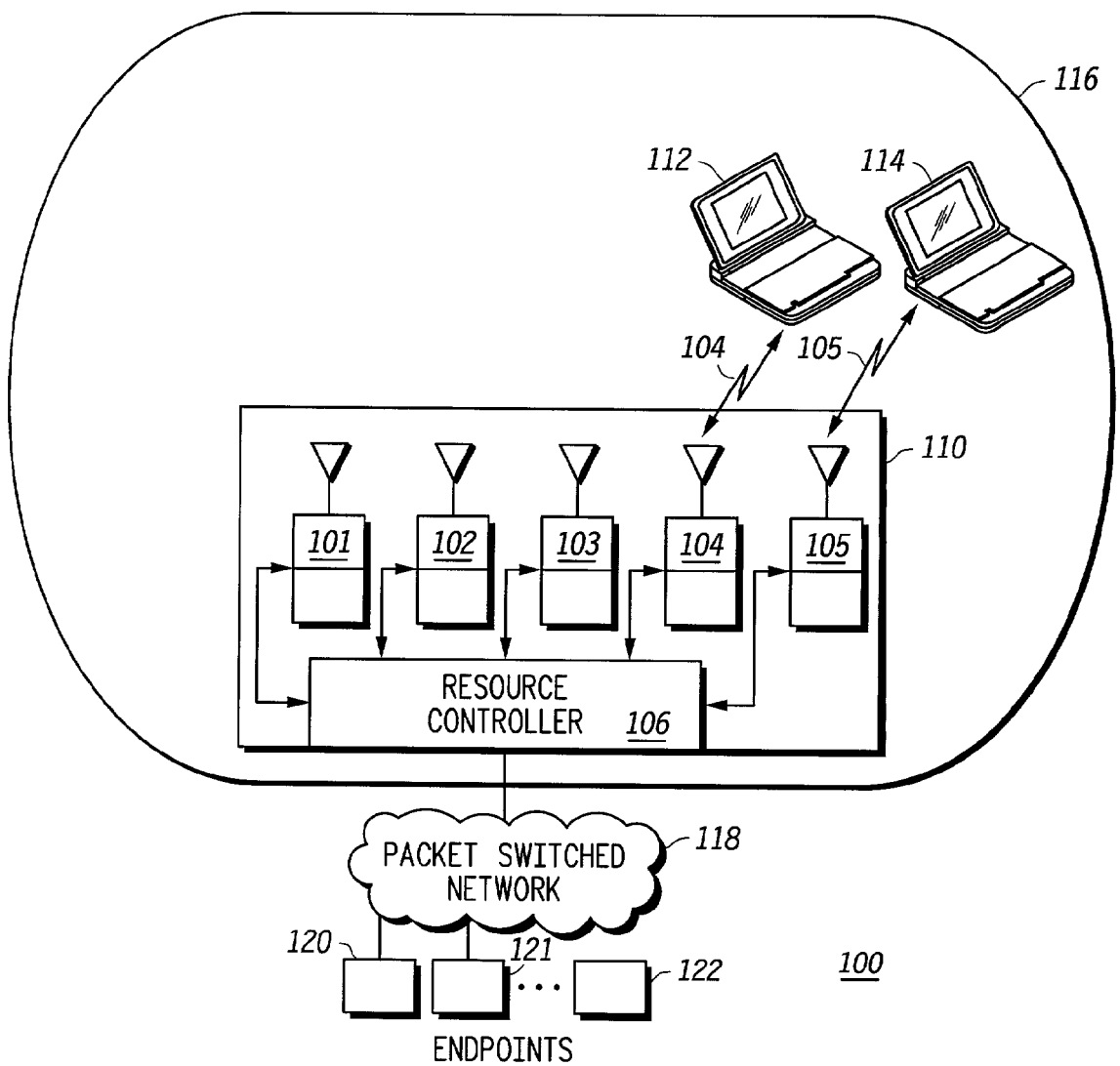
FIG. 1 is a block diagram of a communication system that incorporates a communication resource controller.

In one embodiment of the present invention, there is provided a method for requested access to a communication resource by a wireless communication unit. The communication unit sends, to a communication resource controller, a request for access to a communication resource. The request includes an identification of the communication unit, a requested service type and an access control identifier associated with the communication unit. Optionally, the access control identifier may be assigned to the communication unit during a context activation procedure. The communication resource controller determines, based on the access control identifier, whether a communication resource is available to support the request and, if so, returns a communication resource allocation message containing the identification of the communication unit, the requested service type and indicia of the available communication resource to support the request. Thereafter, the communication unit may select the communication resource identified in the communication resource allocation message to send and/or receive information via the selected communication resource.

In another embodiment of the present invention, there is provided a method of network-initiated access to a communication resource by a wireless communication unit. The method is similar to that described above, except the communication unit requests access to a communication resource in response to receiving a page request message including an identification of the communication unit and a service type. The page request may be sent by the communication resource controller or other fixed network equipment. In this embodiment, the request for access defines a page response message and includes an identification of the communication unit and the access control identifier associated with the communication unit.

In still another embodiment of the present invention, there is provided a method for autonomous or requested access to a communication resource by a wireless communication unit. The communication unit receives, from a communication resource controller or other fixed network equipment, a service advertisement message including indicia of a communication resource and one or more access control identifiers associated with the communication resource. Based on the service advertisement message, the communication unit determines its eligibility of the communication unit to access the communication resource. If the communication unit determines it is eligible for autonomous access to the communication resource, it may select the communication resource to send and/or receive information via the selected communication resource (i.e., without having requested resources from the communication resource controller).

In still yet another embodiment of the present invention, there is provided a method for a communication resource controller to allocate communication resources at a site for no access, autonomous access or requested access for selected user groups. The communication resource determines an availability status of one or more communication resources for a selected user group and, based on the availability status, sends a channel announcement message indicating one of: requested access, autonomous access and no access to at least a first communication resource of the one or more communication resources, by the selected user group.

Turning now to the drawings and referring initially to FIG. 1, there is shown a communication system 100 that includes a plurality of RF transceivers 101-105, a communication resource controller 106 and a packet data gateway 108 associated with a base station 110. The RF transceivers 101-105 use wireless communication resources 101-105 to communicate with mobile or portable communication units 112, 114 distributed within the coverage area 116 of base site 110. As shown, the communication units 112, 114 comprise mobile computers that may be sources or recipients of packet data. However, as will be appreciated, the communication units may also comprise mobile or portable radio units, cellular telephony devices, or generally any wireless communication device.

For convenience, reference numerals 101-105 will denote the communication resources associated with RF transceivers 101-105, as well as the RF transceivers themselves. The communication resources 101-105 may comprise virtually any radio frequency (RF) channel type, including but not limited to narrow band frequency modulated channels, time division modulated slots, carrier frequencies and frequency pairs, which may be accessed by Frequency Division Multiple Access (FDMA), Time Division Multiple Access (FDMA), Code Division Multiple Access (CDMA) or generally any means of channel access. As will be appreciated, while five RF transceivers 101-105 are shown at a single base site 110, the present invention may be implemented with fewer or greater numbers of RF transceivers and/or multiple sites.

In one embodiment, one of the RF transceivers (e.g., transceiver 101) is designated as a control channel transceiver, while the remaining transceivers (e.g., transceivers 102-105) are designated as payload channel transceivers. In such case, communication resource 101 is dedicated for communicating control information and communication resources 102-105 are used for communicating payload information to and from the communication units 112, 114. As will be appreciated, however, each of the transceivers 101-105 is capable of communicating payload information, control information, or combined payload and control information, via the respective communication resources 101-105. The payload channels 102-105 (or 101-105) may be partitioned for use by different user groups, for example, channels 102 and 103 dedicated for user group A, channel 104 dedicated for user group B and channel 105 dedicated for user group C substantially as has been described. Alternatively, the payload channels 102-105 can be partitioned for use by either user group A, B or C and assigned dynamically by the communication resource controller 106.

The communication resource controller 106 controls the allocation of the communication resources 101-105 for use by the communication units 112, 114. As will be appreciated, the communication resource controller is a functional element that may reside within the base site 110, may reside at a fixed equipment ("infrastructure") site remote from the base site 110, or may be distributed among multiple base sites and/or infrastructure sites. According to principles of the present invention, the communication resource controller 106 provides for requested access, network-initiated access or autonomous access to the various communication resources 101-105 by the communication units 112, 114, based on access control identifiers assigned to the communication units and system loading parameters. The different types of access and the management of the different types of access by the communication resource controller will be described in greater detail in relation to FIGS. 3-6.

The communication resource controller 106 further provides a packet data gateway, or interface between the base site 110, and hence the communication units 112, 114 within the coverage area 116 of base site 110, to a packet switched network 118. The packet switched network 118 comprises a series of routers (or more generally, packet switches) for transporting data, including but not limited to Internet Protocol (IP) datagrams between the base site 110 and other endpoints 120-122. The endpoints 120-122 may comprise, for example, other base sites, transceivers, communication resource controllers, consoles, servers or generally any device that may be a source or recipient of data communicated to or from the base site 110, and hence to or from the communication units 112, 114. As will be appreciated, the endpoints 120-122, as well as the transceivers 101-105, communication resource controller 106 and communication units 112, 114 include respective processors (which may comprise, for example, microprocessors, microcontrollers, digital signal processors or combination of such devices) and memory (which may comprise, for example, volatile or non-volatile digital storage devices or combination of such devices).

Figure 2:
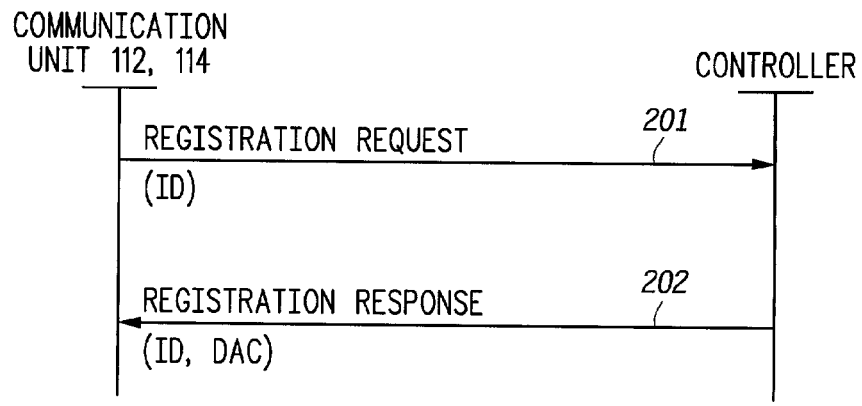
FIG. 2 is a message sequence chart illustrating the assignment of an access control identifier to a communication unit during context activation.

FIG. 2 is a message sequence chart illustrating the assignment of an access control identifier to a communication unit. In one embodiment, the access control identifier comprises an 16-bit Data Access Control (DAC) field that is communicated to the communication units 112, 114 during a registration or context activation procedure. As is known in the art, context activation involves the negotiation of a packet data context between the communication units 112, 114 and the communication resource controller 106. A communication unit may be assigned more than one DAC. The communication unit may choose which DAC to use or alternatively, may have multiple packet data contexts and/or DACs simultaneously active.

The communication unit 112 or 114 sends a registration request message 201 to the communication resource controller 106. In one embodiment, the registration request message 201 includes an identification (ID) of the communication unit. Optionally, the registration request message may specify service parameters, such as a desired service type, a desired quality of service, and so forth. Upon receiving the registration request message 201, the controller 106 sends a registration response message 202 to the communication unit 112 or 114. The communication unit retains the DAC along with other context based parameters.

In one embodiment, the registration response message 202 includes the ID of the communication unit and an access control identifier (i.e., DAC field) associated with the communication unit. Optionally, the registration response message may include an IP address and/or service parameters associated with the communication unit. In one embodiment, the controller 106 maintains a mapping of DAC(s) assigned to particular communication units with the user group(s) associated with those communication units. Thus, the controller 106 knows which DACs are associated with which user groups. As has been noted, the user groups may correspond to different user organizations, grades of service, priorities and/or radio capabilities.

FIG. 3 is a message sequence chart illustrating requested access to a communication resource by a communication unit 112, 114. It is presumed that the communication unit is in possession of one or more access control identifiers (e.g., stored in memory) assigned prior to the message sequence. In one embodiment, the access control identifiers are received from the controller 106 through a context activation procedure, as has been described in relation to FIG. 2. Alternatively, the access control identifiers may be received from the controller 106 or other network equipment independent from the context activation procedure. As still another alternative, the access control identifiers could form a part of a code plug programmed into the communication units 112, 114 during manufacture or subsequent update(s).

The message sequence of FIG. 3 begins with the communication unit sending, to the communication resource controller 106 or other fixed network equipment, a call request message 302. In one embodiment, the call request message 302 includes the identification (ID) of the communication unit and an access control identifier (DAC) associated with the communication unit. Optionally, the call request message 302 may indicate a request for a particular type of service. In one embodiment, the call request message 302 is sent via a dedicated control channel (e.g., transceiver 101, FIG. 1).

Upon receiving the call request message 302, the controller determines an availability of communication resource(s) to support the request, based on the access control identifier. That is, the controller can use the access control identifier(s) to determine appropriate resource(s), if any, for the request. For example, with reference to FIG. 1, consider the case where channels 102 and 103 are partitioned for user group A, channel 104 is partitioned for user group B and channel 105 is partitioned for user group C. The controller knows which DACs are associated with the respective user groups A, B and C and which channels are associated with the respective user groups. Because the controller can determine user groups from the DAC(s), the controller does not need to maintain a mapping of communication unit ID to user groups at the site. If channel 102 is available, and if the DAC in a call request identifies the requesting communication unit as a member of user group A, the controller may determine that channel 102 is available for the requesting unit. Conversely, if the DAC identifies the requesting communication unit as a member of user group B, the controller may determine that channel 102 is unavailable for the requesting unit.

If the controller determines that a communication resource is available for the requesting communication unit, it returns a call grant message 304 to the requesting communication unit. In one embodiment, the call grant message 304 includes the identification (ID) of the requesting communication unit and indicia of the communication resource ("CHL") available for the requesting communication unit. Optionally, the call grant message 304 may indicate an availability of a particular service requested by the communication unit. In one embodiment, the call grant message 304 is sent via a dedicated control channel (e.g., transceiver 101, FIG. 1).

Upon receiving the call grant message 304 indicating an available communication resource, the communication unit selects the communication resource, or moves to the indicated channel at step 306. Having selected the communication resource, the communication unit may thereafter send information to a receiving device, or receive information from a sending device, via the selected communication resource. For example, communication unit 112 or 114 may send or receive packet data to or from the endpoints 120-122 connected to the packet switched network 118.

FIG. 4 is a message sequence chart illustrating autonomous access to a communication resource by a communication unit 112, 114. As in the case of requested access, it is presumed that the communication unit is in possession of one or more access control identifiers assigned prior to the message sequence, which access control identifiers may have been received through a context activation procedure.

The message sequence of FIG. 4 begins with the controller 106 or other network device sending, to the communication unit 112, 114, periodic service advertisement messages 402. In one embodiment, the service advertisement message(s) 402 include indicia of a communication resource and one or more access control identifiers (DACs) associated with the communication resource. In one embodiment, the service advertisement message(s) 402 are sent via a dedicated control channel (e.g., transceiver 101, FIG. 1). In one embodiment, the service advertisement message indicates an availability of autonomous access to the communication resource, for example, by setting an autonomous access "flag" in the service advertisement message. In such embodiment, flag(s) or other appropriate mechanism may also be used to indicate that the advertised channel is available for requested access or not available. Alternatively, the service advertisement itself, without flags or other indication, may inherently indicate that the advertised channel is available for autonomous access.

In one embodiment, upon receiving the service advertisement message 402, a receiving communication unit determines its eligibility to access the communication resource by comparing the DAC(s) associated with the communication resource (the "advertised DAC(s)") to the DAC(s) previously assigned to the communication unit, stored in its memory. For example, if a channel is advertised as available for autonomous access for certain advertised DAC(s), and if an advertised DAC matches any of the stored DAC(s) in the communication unit, the communication unit determines that it is eligible for autonomous access to the advertised resource. Stated differently, the communication unit executes a Boolean logic "and" between the previously assigned DAC field(s) and the currently advertised DAC field. If the result is non-zero, then a match indicates eligibility for autonomous access to the advertised channel. Similarly, if a channel is advertised as available for requested access (or no access) for certain advertised DAC(s), and if an advertised DAC matches any of the stored DAC(s) of the communication unit, the communication unit determines that it must request access to (or that it cannot access) the advertised channel. It is possible that multiple DAC(s), associated potentially with multiple communication units, may match a single advertised DAC.

If the communication unit determines that it is eligible for autonomous access to the advertised resource, it selects the communication resource, or moves to the indicated channel at step 404 to begin service autonomously, i.e., without requesting resources from the communication resource controller and hence, without using the control channel. Having selected the communication resource, the communication unit may thereafter send information to a receiving device, or receive information from a sending device, via the selected communication resource. For example, the communication unit may send or receive packet data to or from the endpoints 120-122 connected to the packet switched network 118.

If the communication unit determines that it is eligible for requested access to the advertised resource, it may request access to the resource by sending a call request to the communication resource controller as described in relation to FIG. 3. Of course, even if the communication unit determines that it is not eligible for either autonomous or requested access to the advertised resource, the communication unit may send a call request to the communication resource controller in an attempt to access resources other than the advertised channel.

FIG. 5 is a message sequence chart illustrating network- or system-initiated access to a communication resource by a communication unit 112, 114. Again, it is presumed that the communication unit is in possession of one or more access control identifiers assigned prior to the message sequence.

The message sequence of FIG. 5 begins with the controller 106 or other network device sending, to the communication unit 112, 114, a page request message 502. In one embodiment, the page request message 502 includes the desired context but not the desired DAC. For example, the page request message may include an identification (ID) of a communication unit which is desired to respond to the page request and a particular type of service that is available for the communication unit. In one embodiment, the page request message 502 is sent via a dedicated control channel (e.g., transceiver 101, FIG. 1).

As shown, upon receiving the page request message 502, the communication unit responds with a page response message 504. In one embodiment, the page response message 504 includes the identification (ID) of the communication unit and an access control identifier (DAC) associated with the communication unit. Optionally, the page response message 504 may indicate a request for a particular type of service. In effect, the page response message 504 is a type of call request message, (see message 302, FIG. 3) that is submitted in response to receiving the page request message 502. For convenience, the communication unit sending the page response message 504 will be thereby referred to as a requesting communication unit. In one embodiment, the page response message 504 is sent via a dedicated control channel (e.g., transceiver 101, FIG. 1).

Upon receiving the page response message 504, the controller determines an availability of communication resource(s) to support the request, based on the access control identifier, as described in relation to FIG. 3. If the controller determines that a communication resource is available for the requesting communication unit, it returns a call grant message 506 to the requesting communication unit. In one embodiment, the call grant message 506 includes the identification (ID) of the requesting communication unit and indicia of the communication resource (e.g., channel) available for the requesting communication unit. Optionally, the call grant message 506 may indicate an availability of a particular service requested by the communication unit. In one embodiment, the call grant message 506 is sent via a dedicated control channel (e.g., transceiver 101, FIG. 1).

Upon receiving the call grant message 506 indicating an available communication resource, the communication unit selects the communication resource, or moves to the indicated channel at step 508. Having selected the communication resource, the communication unit may thereafter send information to a receiving device, or receive information from a sending device, via the selected communication resource. For example, communication unit 112 or 114 may send or receive packet data to or from the endpoints 120-122 connected to the packet switched network 118.

Now turning to FIG. 6, there will be described a method of a communication resource controller to provision or control the type of access (e.g., between autonomous or requested access) to communication resource(s) of a trunked communication system. The method presumes that a plurality of communication resources at a particular site are partitioned for use by one or more user groups. For convenience, the method will be described in relation to a system of the type shown in FIG. 1, in the example where channel 101 is a dedicated control channel, channels 102 and 103 are partitioned for user group A, channel 104 is partitioned for user group B and channel 105 is partitioned for user group C. For purposes of explanation, it will further be assumed that communication units 112, 114 are members of user groups A and B, respectively, and accordingly have been assigned DACs that are mapped to user groups A and B by the communication resource controller.

Figure 6:
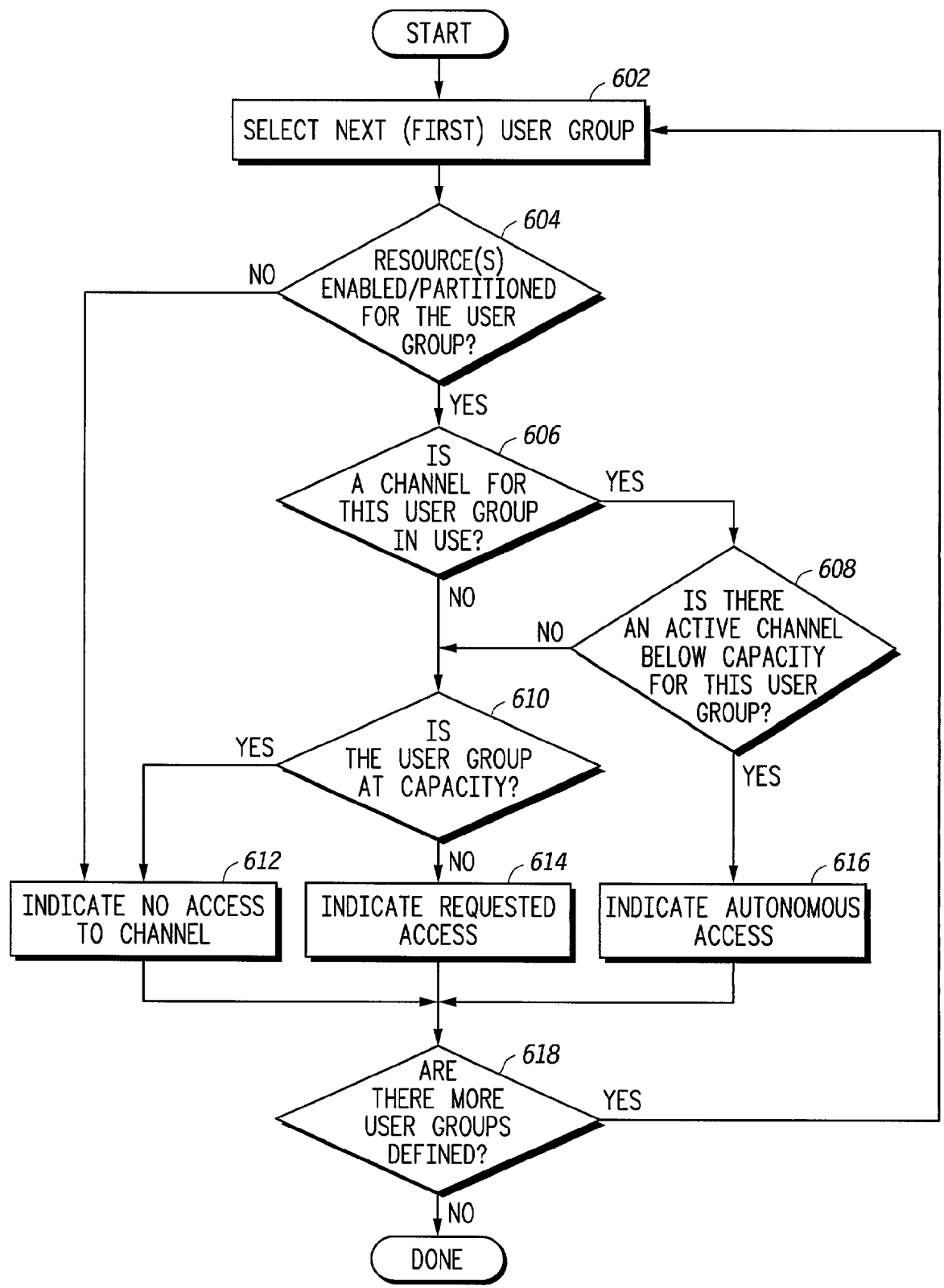
FIG. 6 is a flowchart showing a method of a communication resource controller provisioning between types of access to communication resources by communication unit(s) according to one embodiment of the present invention.

Generally, the method of FIG. 6 provides for the communication resource controller to determine, for one or more user groups (e.g., user groups A, B, C), an availability status of the communication resources (e.g., channels 101-105) for the respective user groups. Based on the availability status, the communication resource controller sends channel announcement message(s) to selected user groups indicating either requested access, autonomous access or no access to one or more of the communication resources by the selected user groups. For example, the channel announcement message(s) may comprise service advertisement message(s) substantially as described in relation to FIG. 4, including indicia of a communication resource, one or more access control identifiers ("advertised DAC(s)") and flags or other appropriate indicia of requested, autonomous or no access to the communication resource by eligible communication units. Communication units determine their eligibility for the advertised resource by comparing the advertised DAC to DAC(s) stored in their memory, as has been described.

At step 602, the controller selects a first user group, e.g., user group A. Then, at step 604, the controller determines whether any communication resources at the site are partitioned and enabled for user group A. In the present example, channels 102 and 103 are partitioned for user group A. As used, herein "enabled" means simply that the partitioned resources are not administratively or effectively disabled. For purposes of the present example, it will be assumed that channels 102 and 103 are partitioned and enabled for user group A.

In one embodiment, if the communication resource controller determines at step 604 that there are no resources partitioned and enabled for the selected user group, the communication resource controller sends a channel announcement message at step 612 indicating no access to a resource or resources by the selected user group. This step presumes that there are users of that group that are available to receive the advertisement; the channel announcement message need not be sent if there are no users of that group available to receive the advertisement. If the communication resource controller determines at step 604 that there is at least one resource partitioned and enabled for the selected user group, the process proceeds to step 606. In the present example, therefore, in the case of user group A, the controller will have determined that at least one resource (e.g., channels 102 and 103) is partitioned for user group A, and hence will proceed to step 606.

At step 606, the communication resource controller determines whether any of the resources partitioned for the selected user group are in use, or otherwise "active" such that they may accept users. If the communication resource controller determines at step 606 that any resource portioned for the user group is in use (or "active"), the process proceeds to step 608. Otherwise, if the communication resource controller determines at step 606 that there are no active resources associated with the user group, the process proceeds to step 610.

At step 608, the communication resource controller determines whether there is an active resource for the selected user group that is below capacity (i.e., that is not "full"). If so, the channel is advertised at step 616 as available for autonomous access by the selected user group. Thus, continuing the present example, if the controller determines that channel 102 is active and below capacity, it may send a channel advertisement message at step 616 indicating that channel 102 is available for autonomous access for DAC(s) associated with user group A. Otherwise, if the communication resource controller determines at step 608 that there is an active resource for the selected user group that is not below capacity (i.e., that is "full"), the process proceeds to step 610.

At step 610, the communication resource controller determines whether the selected user group (e.g., user group A) is at capacity. If the selected user group is not at capacity, such that it can accept additional users, the communication resource controller sends a channel announcement message at step 614 indicating requested access to the appropriate resource(s) (i.e., those resources that are not active, or those that are active and "full"). If the selected user group is at capacity, such that it can not accept additional users, the communication resource controller sends a channel announcement message at step 612 indicating no access to the appropriate resource(s) by the selected user group.

The present disclosure therefore has identified methods for accessing a trunked resource using a combination of requested access and autonomous (unrequested) access. The disclosed methods reduce the use of control bandwidth for service requests and grants and enable the use of user group partitioning. The disclosed methods eliminate the need for a communication resource controller to maintain a communication unit to user group mapping associated with a particular site. The disclosure further identifies a method for controlling the provisioning of requested and autonomous access to trunked resources for optimum channel loading.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising a wireless communication unit performing the steps of:

at the wireless communication unit in a trunked radio communication system:
   receiving a service advertisement message including indicia of a communication resource, wherein the communication resource comprises a radio frequency channel, and one or more access control identifiers associated with the communication resource, wherein the service advertisement message indicates an availability of autonomous access to the communication resource;
   determining, based on the service advertisement message, an eligibility of the communication unit for autonomous access to the communication resource; and
   if the communication unit is eligible for autonomous access to the communication resource, then selecting, by the communication unit, the communication resource; and performing at least one of a) sending packet data, via the communication resource, to a receiving device and b) receiving packet data, via the communication resource, from a sending device.

2. The method of claim 1, wherein the step of receiving a service advertisement message is accomplished by the communication unit monitoring a dedicated control channel.

3. The method of claim 1, wherein the step of determining comprises:
   comparing the access control identifiers associated with the communication resource to an access control identifier associated with the communication unit; and if the access control identifier associated with the communication unit matches any of the access control identifiers associated with the communication resource, determining the communication unit eligible for autonomous access to the communication resource.

4. The method of claim 1, wherein the service advertisement message indicates an availability of requested access to the communication resource.

5. The method of claim 1, wherein the service advertisement message identifies the communication resource as unavailable for requested access or autonomous access.

6. A method comprising a communication resource controller performing the steps of: at a communication resource controller in a trunked radio communication system:
   determining, for a selected user group, an availability status of one or more communication resources of a plurality of trunked communication resources at a site; and
   based on the availability status, sending a channel announcement message indicating autonomous access to at least a first communication resource of the one or more communication resources, by the selected user group,
   wherein a communication resource comprises a radio frequency channel.

7. The method of claim 6, wherein the selected user group is partitioned for use of at least one communication resource of the one or more communication resources, thereby defining at least one partitioned resource, the step of determining an availability status comprising:
   determining whether any partitioned resource is in use;
   if any partitioned resource is in use, thereby defining an active resource, determining whether the active resource is below capacity for the selected user group; and
   if any active resource is below capacity for the selected user group, sending a channel announcement message indicating autonomous access to the active resource by the selected user group.

8. The method of claim 7, wherein if no active resource is below capacity for the selected user group, the step of determining an availability status further comprises:
   determining whether the selected user group can accept additional users; and
   if the selected user group can accept additional users, sending a channel announcement message indicating requested access to the active resource by the selected user group; otherwise
   if the selected user group can not accept additional users, sending a channel announcement message indicating no access to the active resource by the selected user group.

9. The method of claim 7, wherein if no partitioned resource is in use, thereby defining one or more inactive resources, the step of determining an availability status further comprises:
   determining whether the selected user group can accept additional users; and
   if the selected user group can accept additional users, sending a channel announcement message indicating requested access to at least a first communication resource of the one or more inactive resources by the selected user group; otherwise
   if the selected user group can not accept additional users, sending a channel announcement message indicating no access to at least a first communication resource of the one or more inactive resources by the selected user group.

* * * * *